(12) United States Patent
Karppanen

(10) Patent No.: US 9,971,563 B2
(45) Date of Patent: *May 15, 2018

(54) SYSTEMS AND METHODS FOR LOW INTERFERENCE LOGGING AND DIAGNOSTICS

(71) Applicant: Amazon Technologies, Inc., Seattle, WA (US)

(72) Inventor: Jari Juhani Karppanen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/389,325

(22) Filed: Dec. 22, 2016

(65) Prior Publication Data

US 2017/0102919 A1 Apr. 13, 2017

Related U.S. Application Data

(63) Continuation of application No. 14/578,295, filed on Dec. 19, 2014, now Pat. No. 9,529,568.

(51) Int. Cl.
*G06F 3/00* (2006.01)
*G06F 5/00* (2006.01)
*G06F 5/14* (2006.01)

(52) U.S. Cl.
CPC .......... *G06F 5/14* (2013.01); *G06F 2205/062* (2013.01)

(58) Field of Classification Search
None
See application file for complete search history.

(56) References Cited

U.S. PATENT DOCUMENTS

| | | | |
|---|---|---|---|
| 7,398,521 B2 * | 7/2008 | Hoflehner | G06F 8/441 717/151 |
| 8,478,800 B1 * | 7/2013 | Johnson | H04L 67/42 707/827 |
| 2006/0206539 A1 * | 9/2006 | Thompson | G06F 11/0748 |
| 2008/0243688 A1 * | 10/2008 | Hart | G06F 21/31 705/41 |
| 2008/0243751 A1 | 10/2008 | Gormish et al. | |
| 2010/0145978 A1 | 6/2010 | Anashkin et al. | |
| 2014/0149697 A1 * | 5/2014 | Thomsen | G06F 11/004 711/162 |
| 2015/0067262 A1 | 3/2015 | Uttamchandani et al. | |

* cited by examiner

*Primary Examiner* — Elias Mamo
(74) *Attorney, Agent, or Firm* — Davis Wright Tremaine LLP

(57) ABSTRACT

Techniques described and suggested herein include systems and methods for logging execution of code using thread-local output buffers. For example, one or more output buffers are allocated to one or more threads executing on a computing system. A global declaration list containing information relating to log types (e.g., verbose log descriptions, templates for specific variables, and the like) may be implemented, and the global declaration list may be generated as part of an initialization process for some or all of the threads. Log events from executing threads may be stored in the output buffers in a fashion conforming to the global declaration list, and may be retrieved asynchronously relative to the executing threads.

20 Claims, 8 Drawing Sheets

SYSTEMS AND METHODS FOR LOW INTERFERENCE LOGGING AND DIAGNOSTICS

CROSS REFERENCE TO RELATED APPLICATIONS

This application is a continuation of U.S. patent application Ser. No. 14/578,295, filed Dec. 19, 2014, entitled "SYSTEMS AND METHODS FOR LOW INTERFERENCE LOGGING AND DIAGNOSTICS," which is incorporated by reference for all purposes.

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and to adaptively satisfy their computing needs, whereby the computing and storage resources used by the content providers and online merchants are added or removed from a large pool provided by a computing resource provider as need and depending on their needs.

As network computing and other high performance, parallelized applications have increased in complexity, performance, and popularity, diagnosis of issues such as hardware and software bugs has become increasingly complex. Logging of events related to software and firmware execution is an important tool in diagnosing issues arising from faulty software and/or hardware, but in some instances, logging implementations may alter the operation of such software and hardware sufficiently that some or all of the issues being diagnosed cannot be replicated. Furthermore, logging implementations can dramatically slow down the execution of code, which can have deleterious effects on the availability and performance of, e.g., network computing and storage services provided to customers.

BRIEF DESCRIPTION OF THE DRAWINGS

Various embodiments in accordance with the present disclosure will be described with reference to the drawings, in which.

DETAILED DESCRIPTION

Figure 1:
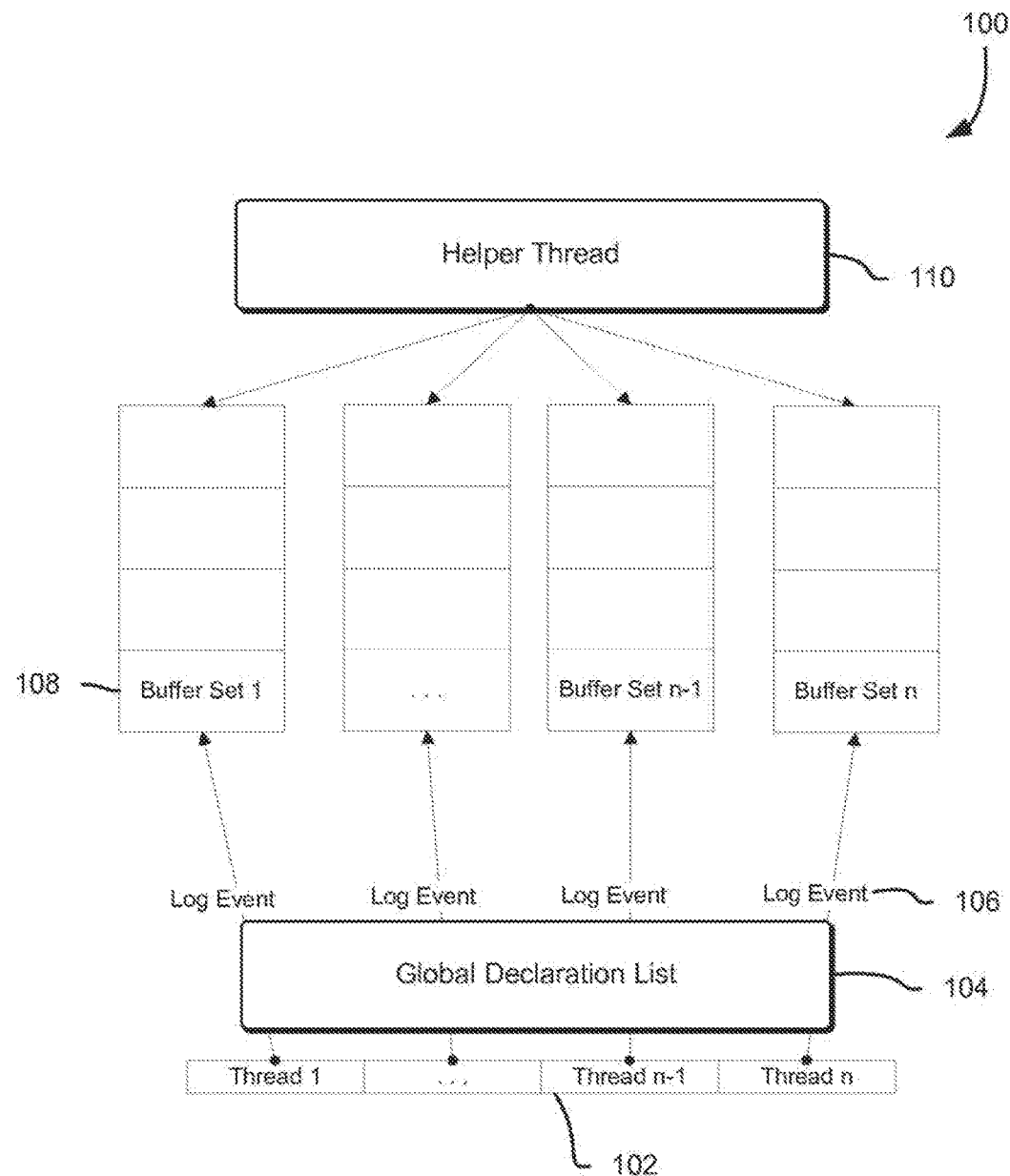
FIG. 1 schematically illustrates an environment implementing thread-local output buffers for capturing logging information, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for logging execution of code using thread-local output buffers. For example, one or more output buffers are allocated to one or more threads executing on a computing system. In some embodiments, a plurality of allocated output buffers are allocated specifically for use of a given thread. A global declaration list containing information relating to log types (e.g., verbose log descriptions, templates for specific variables, and the like) may be implemented, and the global declaration list may be generated as part of an initialization process for some or all of the threads. The global declaration list may alternatively be generated dynamically, such as upon the first instance of a given log type declaration or other log event as received from a thread.

At a time after the global declaration list has been generated, threads executing code may submit log events to be written as log entries to the output buffers. In some embodiments, one, or a subset, of the output buffers allocated for a given thread is selected as the active output buffer for that given thread, and the log entries may be written to that output buffer until such time as the output buffer is full or is otherwise unable to commit further log entries. The log entries may, in some embodiments, be in a format defined by the log type declarations populating the global declaration list. For example, if a log event is of a known log type as recorded in the global declaration list, further log events may simply be written as log entries that include a series of values denoting the log type (e.g., by a unique identifier), as well as any data that can "fill in" the values expected of that log type according to the log type declaration.

In some embodiments, counter values are written to the output buffers in association with the log entries, so as to provide references for, e.g., the order, absolute time, and/or relative time at which the log entries were committed. Such counter values may be provided at various intervals or upon demand, such as by an executing thread or an agent of the implementing computing system. The counter values may be arbitrary indexes or other incrementing counters, or, in some embodiments, may be a time stamp associated with, for example, a system clock of the implementing computing system (or that of the running thread).

In some embodiments, the contents of the output buffers may be committed to a log data store or other storage device. In some embodiments, the committing ("flushing") of the output buffers may occur in response to a command (e.g., manual or automatic), or as previously mentioned, a result of the output buffer being unable to accept further log entries. In some embodiments, a background thread monitors the output buffers and if an output buffer is detected as being full or unavailable, that output buffer may be marked by the monitoring thread for committing and emptying. In some of such monitors, a different output buffer is selected, e.g., by the monitoring thread, to be used by the associated thread as the active output buffer for future log entry writes. The marked output buffer(s) may then be written to a log data store, and such writing may be done synchronously, asynchronously, and/or at a time after a certain set of environmental factors has been achieved (e.g., system or thread loading below a given threshold, low memory conditions scarce, etc.).

In some embodiments, the log entries written in the log data store may be further processed, such as by using a resource or service of a computing resource service provider, to generate more verbose or human-readable logs than were stored on the output buffers. For example, the processing may include the parsing of such log entries against log type declarations in the global declaration list, interleaving of various log entries based on the associated counter values, and the like. In some embodiments, the log entries present in the output buffers themselves may be processed in a similar fashion, so as to provide, e.g., a freeze-frame or snapshot of an execution state at the observed time.

A helper thread may be implemented so as to retain the contents of the output buffers in the event of an unexpected termination of one or more of the running threads. For example, the helper thread may hold one or more of the output buffers (e.g., as may be allocated in shared memory between the helper thread and the execution threads) and run independently of the execution threads, such that any adverse effects from events relating to the execution threads do not affect the helper thread, and therefore, the data contained in the output buffers to which the helper thread has a hold. The helper thread may be associated with a separate process than that of the execution threads, thereby protecting the buffers (and/or shared memory) from being forceably freed by, e.g., the operating system, in the case that the execution threads terminate prematurely.

In some embodiments, the techniques described may be utilized for realtime (e.g., runtime) monitoring of events associated with the execution threads, as well as the aforementioned logging, such as by reading and/or manipulating the information directly from the output buffers, rather than using the information committed to, e.g., a log data store.

FIG. 1 schematically illustrates an environment implementing thread-local output buffers for capturing logging information, in accordance with some embodiments. One or more threads 102 execute on a computing system, and submit log events 106 in accordance with a global declaration list 104 to a set of output buffers 108. The computing system may be any entity capable of executing threads 102, and by way of example may include physical computing devices and servers, laptops, smartphones, virtual computing systems (such as may be provided by one or more resources of a computing resource service provider, such as the computing resource service provider described in more detail below), computing services, and the like.

The threads 102 may be any sequence of programmed instructions that may be managed by a scheduler, such as a scheduler implemented by the computing system on which the threads 102 are executing. The threads 102 may have access to a shared memory space of the implementing computing system. In some embodiments, a set of one or more output buffers 108 are allocated to one or more of the threads 102 in the shared memory space. In some embodiments, a set of output buffers 108 may be allocated specifically for use of a given thread 102, as depicted in FIG. 1. The output buffers comprising the set 108 may be fixed at the time of allocation, or, in some embodiments, may be dynamically allocated. For example, if the quantity of output buffers in a given set of output buffers is insufficient, e.g., as a result of a large quantity of data written to the output buffers, additional output buffers may dynamically be allocated to the set 108, and therefore, the thread 102 to which the set 108 is associated. The output buffers may be of any appropriate size for the implementation, and the sets of output buffers 108 may include any number of output buffers.

In some embodiments, one, or a subset, of the set of output buffers 108 allocated for a given thread 102 is selected as the active output buffer for that given thread, and log entries may be written to that output buffer until such time as the output buffer is full or is otherwise unable to commit further log entries.

In some embodiments, a global declaration list 104 containing information relating to log types (e.g., verbose log descriptions, templates for specific variables, and the like) may be implemented, and the global declaration list may be generated as part of an initialization process for some or all of the threads 102. For example, the thread may generate predefined log type declarations that include a template of the log event type, the nature of any variables for each log event type, and/or the size/length of some or all of the variables. As an example, one of the log type declarations may indicate a unique identifier (e.g., log type "1"), the verbose form of the log type, (e.g., "thread A wrote X bytes to file F"), the primitive types of applicable variables (e.g., integer A, integer X), the nature of dynamic content (e.g., character string F), and the like. Alternatively (or in addition), the global declaration list may be populated dynamically, such as upon receiving, from a thread, a log event not aligning with an initialized log type declaration. In some embodiments, the thread(s) may add log type declarations during runtime and/or at initialization by writing (e.g., by calling a specific function that declares the log type) one or more log events 106, described in further detail below, to an associated output buffer using a unique identifier known to the implementing system (e.g., known by an entity processing the log events and/or maintaining the global declaration list) as corresponding to an incoming new or updated log type declaration.

At a time after the global declaration list 104 has been generated, threads 102 executing code may submit log events 106 to be written as log entries to the associated output buffers 108. In some embodiments, at initialization, each thread 102 declares all of the log entries and/or log types it will use, so as to generate all necessary log type declarations ahead of time. In some embodiments, the thread(s) 102 may perform such declarations before and/or incident with writing a given log entry (in cases where a delay potentially caused by such declarations does not adversely affect the performance of the threads 102). The log entries may, in some embodiments, be in a format defined by the log type declarations populating the global declaration list. For example, if a log event is of a known log type as previously recorded in the global declaration list, further log events of that type may simply be written as log entries that include a series of values defined by the applicable log type declaration. In the example provided immediately above, assuming that log type "1" was associated with "thread A wrote X bytes to file F," a log event equivalent to "thread 2 wrote 1024 bytes to file "samplefile.txt" could be recorded as a log entry similar to log(1,2,1024, "samplefile.txt"). In some embodiments, rather than the log type declaration and the log entry write to the output buffer being executed as two phases, both may occur as a result of a single log event. For example, a thread may submit a log event similar to "thread 2 received 2048 packets from address A00" to be written to the output buffer. A resource, such as a resource of a computing resource service provider, may recognize that such a log event has no matching log type declaration in the global declaration list, and may add a new log type declaration for log type "2" and thereon record the log entry as log(2,2,2048,A00) in the appropriate output buffer.

In some embodiments, a log type declaration may extend an existing log type declaration. For example, the new log type declaration may include some or all of the information pertinent to (or identifying) the existing log type declaration. In this example, additional information may cause the implementing entity to update or supersede the existing log type declaration using the additional information.

A helper thread 110 may be implemented so as to retain the contents of the output buffers 108 in the event of an unexpected termination of one or more of the running threads 102. For example, the helper thread 110 may hold one or more of the output buffers 108 and run independently of the execution threads 102, such that any adverse effects from events relating to the threads 102 do not affect the helper thread, and therefore, the data contained in the output buffers 108 to which the helper thread 110 has a hold. The helper thread 110 may be a thread similar to that the threads 102, but rather than perform execution of application code, the helper thread may simply be responsible for tracking and holding open some or all of the allocated output buffers in each set 108. In some embodiments, the helper thread may have a lower priority than that of the threads 102, so as to be generally transparent in operation until such time as one or more of threads 102 are no longer functional, and therefore no longer have complete control over the associated set of output buffers 108. In some embodiments, the helper thread 110 may be of a different process than some or all of the threads 102. The helper thread 110 may, in some embodiments, be responsible for allocating and/or pre-allocating the output buffers 108, such as during thread initialization, for selection and/or use by the execution threads 102 at a later time, such as during runtime of the execution threads 102. There may be any proportion of helper thread(s) 110 to execution threads 102. For example, a single helper thread 110 may be associated with all of the execution threads 102. As another example, there may be a single helper thread 110 for each of the execution threads 102.

Figure 2:
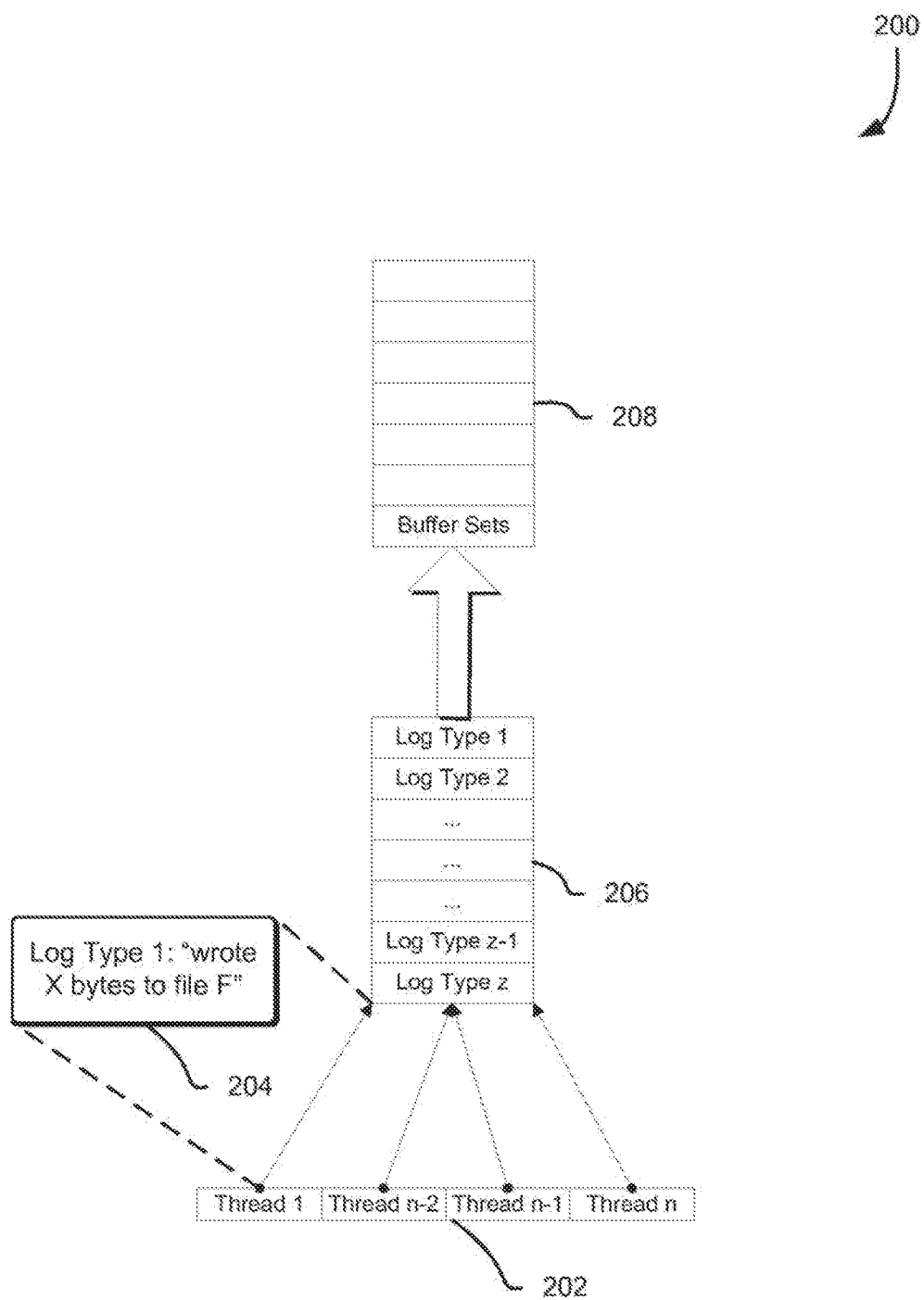
FIG. 2 schematically illustrates various workflows for generating a global declaration list for use in logging code execution, in accordance with some embodiments.

FIG. 2 schematically illustrates various workflows for generating a global declaration list for use in logging code execution, in accordance with some embodiments. One or more threads 202 may generate log type information 204 to be added as log type declarations in a global declaration list 206. Log entries may be written to allocated sets of output buffers 208 according to the log type declarations in the global declaration list 206. As may be contemplated, the threads 202, the global declaration list 206, and the set of output buffers 208 may be similar to the threads 102, the global declaration list 104, and the sets of output buffers 108, respectively, as described in connection with FIG. 1.

As illustrated, the log type information 204 may be received from any thread 202 implementing the techniques described herein. The log type information 204 may, for example, be generated as a result of an initialization process of one or more of the threads 202. In such embodiments, the log type information is predefined during the initialization process, for example, so as to capture specific types of future log events emanating from the threads 202.

In some embodiments, the log type information 204 may be, or be derived from, log events from the threads 202, such as log events 106. In such embodiments, the global declaration list 206 is dynamically updated with new log type declarations as new log types are detected from the log type information. For example, the global declaration list 206 may be only partially, or not at all, generated at time of thread initialization, and the global declaration list 206 may be generated as the threads 202 execute, e.g., in real time. In such embodiments, log events, such as log events 106, may be passed to an implementing computing system, and to the extent that log events of a log type are not already memorialized as a log type declaration in the global declaration list 206, an entity, such as a resource of the implementing computing system, may generate log templates from the received log events, and store them as log type declarations in the global declaration list 206. In some embodiments, the thread(s) may add log type declarations during runtime and/or at initialization by writing the log type declarations, described in further detail below, with a unique identifier known to the implementing system (e.g., known by an entity processing the log events and/or maintaining the global declaration list) as corresponding to an incoming new or updated log type declaration. As may be contemplated, implementations may include aspects of both a pre-initialized global declaration list as well as a real time global declaration list as described herein. In some embodiments, log events corresponding to new and/or updated log type declarations and log events corresponding to log entries to be committed (as described in further detail below) may be sent in any sequence or combination, and in certain embodiments, may be interleaved.

The log type declarations stored in the global declaration list 206 may be defined as log templates that have data fields of either (or both) fixed or dynamic length. For example, the log templates may define data fields as having a fixed width, e.g., fixed input and output widths, which may differ if the incoming data is filtered or only partial information thereof is stored in the data field (such as writing, e.g., 32 bits from a 64 bit integer), such as would be the case if a log type declaration expects an integer in a given field. As another example, the log templates may define data fields that are of indeterminate length, such as would be the case if the log type declaration expects a string in a given field. Log events received from the threads may be handled differently based on whether they contain fixed and/or dynamic length data, and by extension, the nature of the log type declarations stored in the global declaration list 206, as is discussed in further detail herein.

The global declaration list 206 may be transiently generated and/or temporarily or indefinitely stored, such in transitory memory or in a non-transient data store, and may be of any type applicable for the implementation. For example, the global declaration list 206 may be a database, a data structure or collection of data structures, or the like. As an example, each index of an array may point to an object instance representing a formatting template corresponding to the global declaration list. The global declaration list may be persisted in a different structure or fashion than it may be represented in volatile memory. The global declaration list may be serialized and written into the log output as a special log message having a well-known identifier that is not associated with log entries. In some embodiments, two or more instances of the global declaration list may be held in volatile memory, some of which may be in different formats, so as to allow external processes and/or threads to access partially filled output buffers that have not yet been flushed and/or committed to a log data store.

Figure 3:
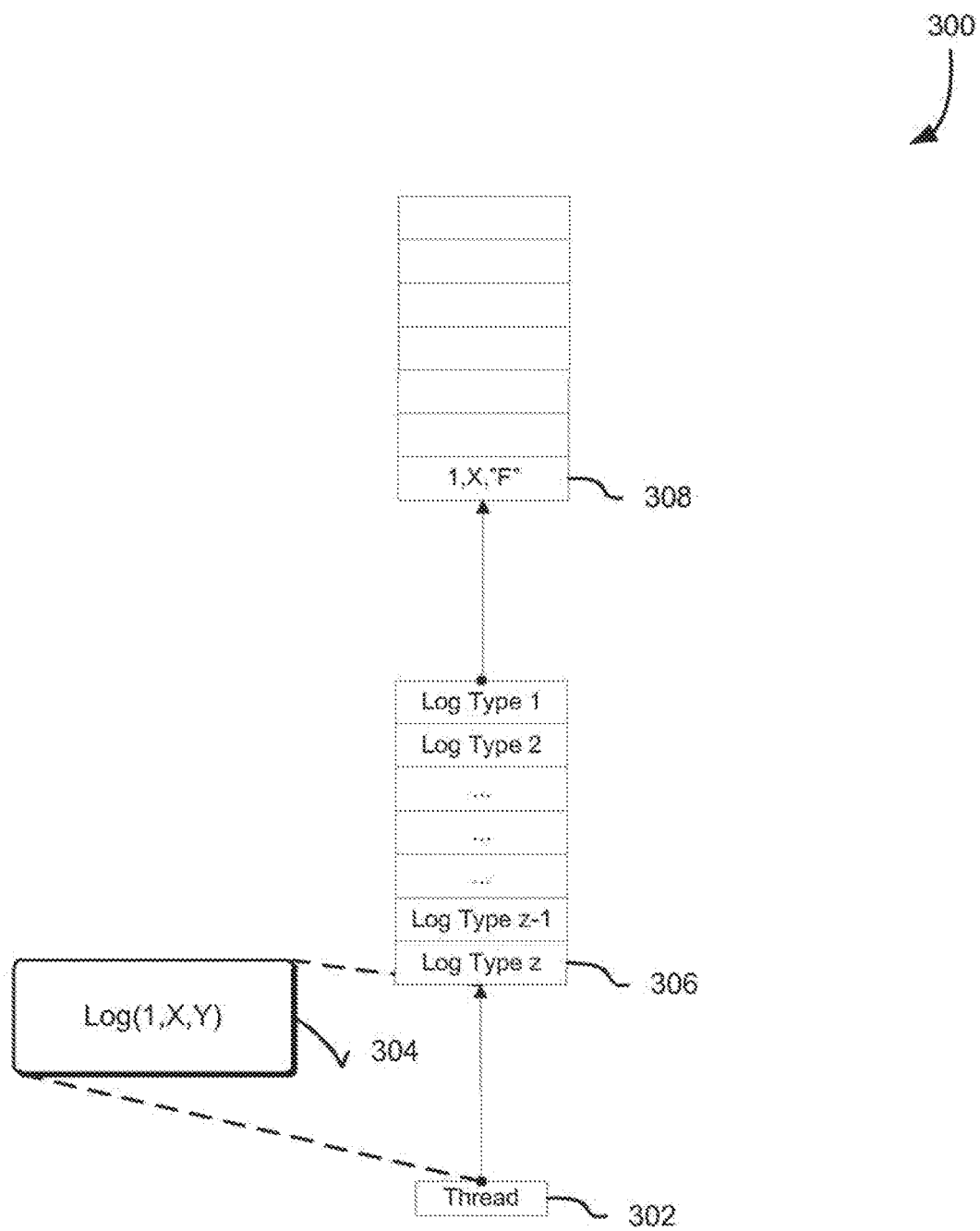
FIG. 3 schematically illustrates various workflows for receiving and storing log entries associated with log events according to a global declaration list, in accordance with some embodiments.

FIG. 3 schematically illustrates various workflows for receiving and storing log entries associated with log events according to a global declaration list, in accordance with some embodiments. One or more threads 302, which may be similar in functionality to the threads 102, 202 described in connection with FIGS. 1 and 2, respectively, submit log events 304 in accordance with one or more log type declarations associated with a global declaration list 306, to be written as log entries on one or more output buffers 308. The log events may be similar to the log events 106 described in connection with FIG. 1. The global declaration list 306 may be similar to the global declaration list 104, 206 described above in connection with FIGS. 1 and 2. The output buffer(s) 308 may be similar to one or more of the output buffers of the sets of output buffers 108, 208 described in connection with FIGS. 1 and 2.

As previously discussed, the log type declarations in the global declaration list 306 may be generated at the initialization of the thread(s) 302, in process as the thread(s) 302 are executing in real time, or some combination thereof. Also as previously discussed, the log type declarations in the global declaration list 306 may be templated such that they include data fields for data of static width, data of dynamic width, or some combination thereof (either across different log type declarations, or in some instances, within the same log type declaration(s)). In embodiments where some or all of the log type declarations include only fixed length data fields, log events 304 emanating from the threads 302 in accordance with such log type declarations may simply be written to the output buffers 308 in a single pass, as the overall length of the eventual log entry is known ahead of time (e.g., if the log type declaration is templated such that there are four data fields, each of which is a short integer that requires two bytes of storage, any ensuing log event conforming to that log type declaration is known in advance to require a total of eight bytes of memory in the output buffer to fully commit the associated log entry). In the illustrated example, log type 1 may correspond to a human-readable log event similar to "the thread received X bytes from address Y," where both X and Y may be integers or similar data types with a fixed, known length (e.g., 2 bytes, in the case of a short integer). The thread 302 may simply submit a log event containing a message such as Log(1,X,Y), and such data may be written directly to the associated output buffer as the overall length of the message is known ahead of time (e.g., 6 bytes, two bytes each for the integer identifier, X, and Y).

In embodiments where some or all of the log type declarations include dynamic length data, such as those including log templates having data fields for strings, it may be contemplated that the overall length of log entries emanating from such log type declarations may not be known prior to actually receiving a log event conforming to those log type declarations. In such embodiments, for log events containing dynamic length data, the associated log entries may be written to the associated set of output buffers 308 in two stages. First, as part of the log event 304, the thread 302 may submit data, such as to the output buffer(s) 308 or another resource of the implementing computing system, similar to that described immediately above, such as the identifier for the appropriate log type declaration, and any fixed length data associated therewith. Additionally, as part of the log event 304, the length of the dynamic data associated therewith may be submitted. As an example, log type 2 may correspond to a human-readable log event similar to "the thread wrote X bytes to filename F," where X may be an integer and F may be a character string of indeterminate length. Thus, an initial stage of the log event 304 from the thread 302 may include a message similar to Log(2,X,L(F)), where 2 identifies log type 2, X is an integer, and L(F) is an integer representing the length in bytes of the string F. As a result, in the example where the first two integers are 2 bytes a piece, and the length of the string is 32 bytes, the implementing computing system may allocate a total of 36 bytes in the associated output buffer 308 for use in the second stage of converting the log event into a log entry. In some embodiments where some or all of the log type declarations include dynamic length data, the thread or other entity of the implementing computing system may submit a log entry in accordance with those log type declaration as if the overall log entry was of fixed length, including a maximum length of the dynamic component (e.g., if the primitive used for the dynamic component is known). In some embodiments, a log type declaration and/or a log entry may include and/or return a pointer to a memory location where the dynamic component may be written (e.g., contemporaneously with or after the log entry's creation).

In some embodiments, the second stage involves the submission of the log event 304, by the thread 302, containing the actual dynamic length data. In the example provided immediately above, the thread 302 may submit Log(2,X,thisisa32bitlongfilename.log) in the second stage, whereupon the output buffer 308 has already allocated the requisite space for the full length of the log entry as a result of the first stage described immediately above. As may be contemplated, both stages may be performed by any appropriate entity, and in some embodiments, the thread 302 may submit the full log message as part of the log event rather than in stages. In such embodiments, a separate entity from the thread 302, such as a different logging thread (e.g., a helper thread, a background/monitoring thread, or other dedicated thread) may perform a conversion of the single log event message into the two stages described immediately above.

Figure 4:
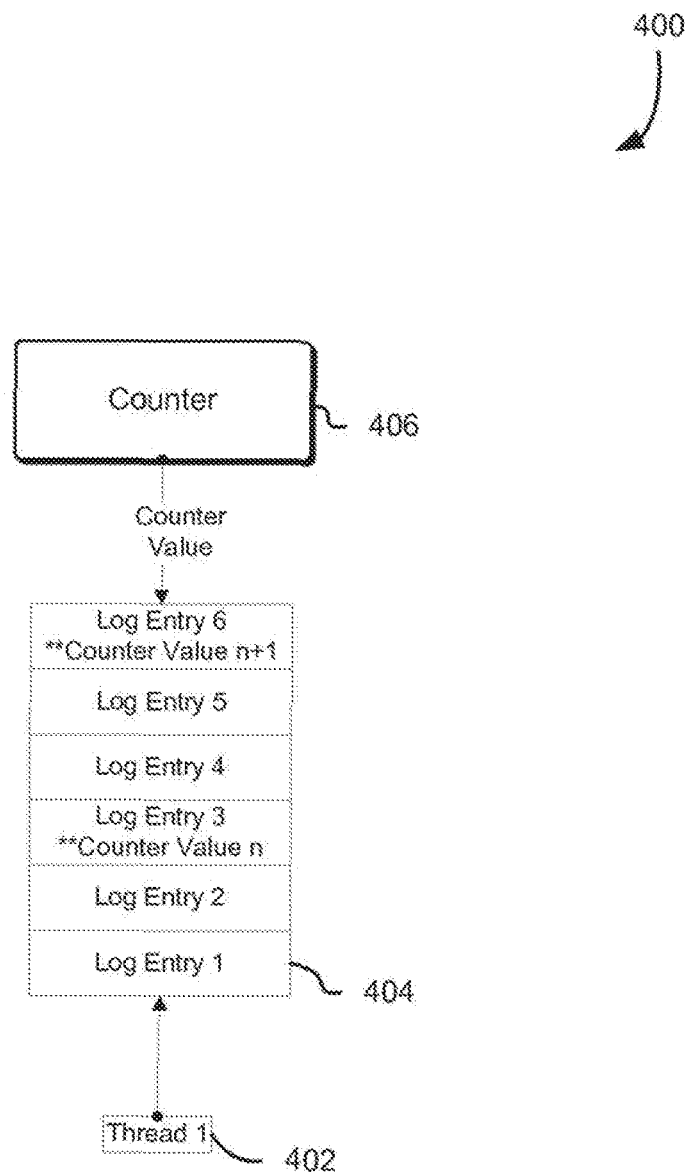
FIG. 4 schematically illustrates various workflows for using counter values in connection with log entries, in accordance with some embodiments.

FIG. 4 schematically illustrates various workflows for using counter values in connection with log entries, in accordance with some embodiments. One or more threads 402 commit log entries to one or more associated output buffers 404, which is/are in communication, either directly or indirectly, with a counter 406. The threads 402 may be similar to threads 102, 202, 302 described above in connection with FIGS. 1 through 3, respectively. The output buffer(s) 404 may be similar to one or more of the output buffers of the sets of output buffers 108, 208, 308 described above in connection with at least FIGS. 1 through 3. The counter 406 may be any entity, in software, hardware, firmware, or otherwise, capable of providing a reference value. For example, the counter 406 may be an incrementing counter implemented in software. As another example, the counter 406 may be a system clock or other time stamp generating entity. The counter 406 may be implemented using the implementing computing system as a reference point (e.g., using a system timer such as a high precision event timer (HPET), or using a value read from a time stamp counter (TSC) of a processor, such as would be returned via the RDTSC x86 processor instruction), from the perspective of the thread(s) 402, from the perspective of the output buffer(s) 404, or any other reference point. In some embodiments, the reference point may be a value generated (or used) by one of the thread(s) 402, and/or the entity upon which that thread is executing. In some embodiments, the counter 406 may provide counter values that use a composite of reference points, such as differing reference points relative to each, some, or all of the thread(s) 402. For example, some of the thread(s) may execute upon entities whose clocks are not necessarily synchronized with one another, and the counter values may be referenced to one of the thread(s), some value that is a composite of the clocks for some or all of the thread(s), and the like.

In embodiments where the counter generates time stamps, such time stamps may be of any type, denomination, accuracy, and/or precision. For example, the time stamps may be the system time in system ticks, calendar date and/or time, and the like, and may be defined to whatever resolution is required by the implementation and supported by the implementing system and/or application. Additionally, the time stamp may be generated with respect to any range or epoch as supported and/or necessitated by the particular implementation.

In some embodiments, as illustrated, counter values as provided by the counter 406 are written to the output buffers 404 in association with the log entries stored thereon, so as to provide references for, e.g., the order, absolute time, and/or relative time at which the log entries were committed. Such counter values may be provided at various intervals or upon demand, such as by an executing thread 402 or an agent of the implementing computing system, such as a thread other than the thread 402 (e.g., background threads, monitoring threads, helper threads, etc.). The counter values may be arbitrary indexes or other incrementing counters, or, in some embodiments, may be a time stamp associated with, for example, a system clock of the implementing computing system (or that of the running thread). In some embodiments, the counter values provided by the counter 406 may themselves be written as log entries 404, and in some of such embodiments, may conform to a log type declaration defined in, e.g., the global declaration list described elsewhere herein.

For example, the counter 406 may write a counter value to the output buffer(s) 404 after, e.g., a monitoring thread (or in some embodiments, a thread or other entity associated with the counter 406 itself) detects that a predetermined quantity of log entries have been written (e.g., every three log entries, etc.). As another example, the counter 406 may indiscriminately write a counter value periodically, at a predetermined interval (e.g., every 1 millisecond, etc.) As may be contemplated, in embodiments where a plurality of parallel thread(s) 402 are executing and writing log entries to a plurality of output buffer(s), such counter values may be used to interleave the log entries, and therefore the associated log events from the threads themselves, so as to reconstruct a timeline for the logging events across multiple threads and multiple output buffers. In such embodiments, the committing of the log entries to the output buffers 404 (or, as further discussed herein, to log data stores) may not necessarily be in order or synchronous with the time at which the log event(s) occurred, such counter values may be used to reconstruct the timeline at some later point, and in an asynchronous fashion, using an entity other than the execution threads 402 to process the log events. As a result, log event handling and reconstruction has considerable fewer effects, both from a timing and a performance standpoint, than if the execution thread(s) 402 themselves were responsible for preserving the order of a plurality of logging events across multiple threads.

In some embodiments, logged events associated with the execution threads may be monitored in realtime, e.g., in connection with runtime of the execution threads, by providing access to the information (e.g., log entries and/or log declarations) stored in the output buffers 404. In some embodiments, the global declaration list and data structures corresponding to, e.g., blocks of the output buffers 404, may be placed into a shared memory area that is managed by the monitoring thread. The reader entity may periodically poll and/or re-parse the shared memory area where information regarding the currently active block location (e.g., as used by the execution threads) in the output buffer is stored (e.g., by the monitoring thread). In some embodiments, the reader entity may be notified (e.g., by the monitoring thread) of buffer management changes (e.g., whether a given output buffer has been partially or fully flushed to a log data store, and/or from which block location). Using this information, in some embodiments, the reader entity may attempt to parse the output buffer block's contents directly, i.e., prior to being flushed to the log data store.

In some embodiments, as a given log entry may in some cases be updated after a given identifier for an associated log type declaration has been committed (given the potential asynchronicity of the system, e.g., if the log entry contains dynamic information performed after the associated static information is written), the thread writing the log entry may place a well-known identifier, such as a flag or a byte, indicating that dynamic data is expected but not yet written in connection with that log entry. As a result, in some embodiments, a reader entity may be notified whether a given log entry is awaiting additional information (and is incomplete).

Figure 5:
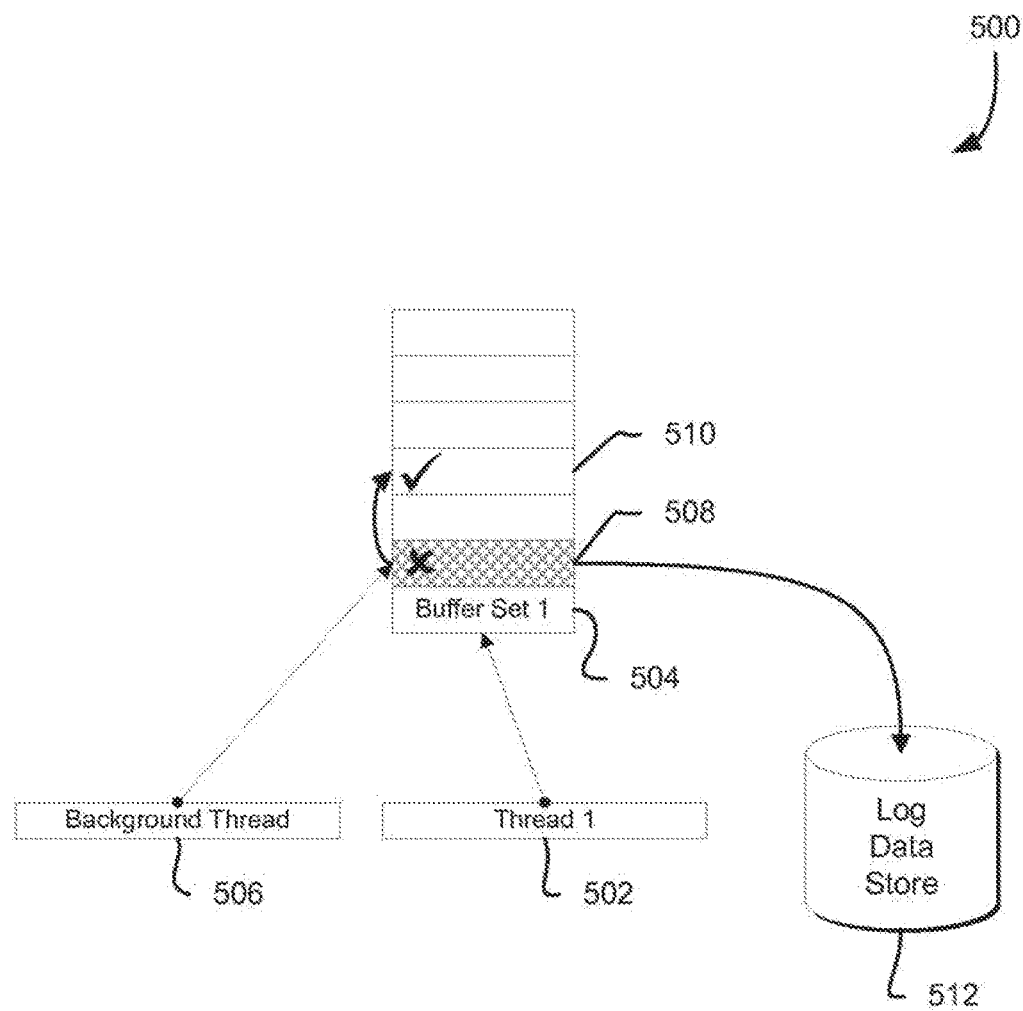
FIG. 5 schematically illustrates various workflows for storing log entries on a log data store in connection with output buffers, in accordance with some embodiments.

FIG. 5 schematically illustrates various workflows for storing log entries on a log data store in connection with output buffers, in accordance with some embodiments. A thread 502 writes log entries, such as using various techniques described elsewhere herein, to a one or more output buffers of a set of output buffers 504 associated with the thread 502. A background thread 506 (also referred to herein as a "monitoring thread") monitors various activity, such as output buffer write, read state, allocation, and the like, of the set of output buffers 504. The background thread 506 may be implemented on any resource of an implementing computing system as appropriate. In some embodiments, a background thread may be responsible for monitoring a plurality of output buffer sets (e.g., associated with a plurality of threads 502), and in other embodiments, a single background thread is responsible for monitoring a single set of output buffers 504. The thread 502 may be similar to the thread(s) 102, 202, 302, 402 described in connection with FIGS. 1 through 4. The set of output buffers may be similar to the sets of output buffers 108, 208, 308, 404 described above in connection with FIGS. 1 through 4.

In some embodiments, the background thread 506 determines when one or more output buffers, such as the active output buffer presently allocated to receive log entries from the thread 502, requires action. In some of such embodiments, the contents of some or all of the output buffers 504, such as the presently active output buffer, may be committed to a log data store 512 or other storage device. The log data store 512 may be any data store capable of receiving and storing data, either temporarily, transiently, or indefinitely, as required by the particular implementation. Examples may include physical data storage devices such as storage servers, network attached storage devices, hard disk drives, solid state disk drives, and optical drives; virtual data storage data devices such as those provided by a data storage service of a computing resource service provider, databases, and the like. The log data store 512 may be a part of the implementing computing system, or separate from it.

In some embodiments, the action required, as determined by the background thread 506, may include committing ("flushing") of some or all of the output buffers 504, such as the active output buffer. For example, the background thread may detect that the output buffer (e.g., 508) has been marked as full or is otherwise no longer usable by the execution thread, due to being full or otherwise unavailable (e.g., as a result of a hardware or software failure). In some embodiments, the execution thread may mark the output buffer(s).

In some embodiments, a different output buffer 510 is selected, e.g., by the execution thread, to be used by the thread as the active output buffer for future log entry writes. In some embodiments, the monitoring thread may be notified (e.g., by the execution thread, such as by setting a flag or other value indicating that the active output buffer is no longer being updated by the execution thread) of the change in active output buffer, or, in other embodiments, the change may be transparent to the thread 502 and instead be handled internally by, e.g., the background thread 506. In some embodiments, the background thread 506 and/or the thread 502 may provide and/or generate information related to log entries to be written to an active buffer 508, and, in the event that the space required for the log entries exceeds available space in the active buffer 508, some or all of the incoming log entries may be written to a different output buffer 510 with sufficient space to accommodate at least the overage.

The contents of the marked output buffer(s) 508 may be written to the log data store 512. Such writing may occur synchronously (e.g., upon or in connection with the marking of the output buffer 508), asynchronously, and/or at a time after a certain set of environmental factors has been achieved (e.g., system or thread loading below a given threshold, low memory conditions scarce, etc.) In some embodiments, in connection with writing to the log data store 512, the contents of the marked output buffer(s) 508 may be adapted so as to match the hardware and/or file system used by the log data store 512 (such as by adding padding information, e.g., log entries with "no-op" identifiers that indicate that the log entry contains no actual logging data). In some embodiments, the background thread 506 determines the appropriate time at which to commit the contents of the marked output buffer(s) to the log data store 512, such as by monitoring the environmental factors and executing the write job when the environmental factors conform to predetermined levels. For example, the background thread 506 may flush the contents of the marked output buffer(s) 508 when it detects that activity of the associated thread 502, e.g., a level and/or frequency of writes to the output buffer(s), drops below a specific level for a predetermined length of time (e.g., detecting an idle condition). As another example, the background thread 506 may flush the contents of the marked output buffer(s) 508 to the log data store 512 when the overall quantity of free memory within some or all of the output buffer(s) or set of output buffer(s) drops below a specified level. In some embodiments, a plurality of output buffer(s) within a given set of output buffers 504 may be marked for action prior to any action taking place on any of the marked output buffer(s) (e.g., may be batched, such as for purposes of efficiency). As another example, the background thread 506 may flush the output buffer(s) when the application (e.g., the execution threads associated therewith) terminates, so as to avoid interference in the runtime of the application due to, e.g., input/output activity caused by the flushing. In some embodiments, after having been flushed, marked output buffer(s) 508 may be unmarked or otherwise be returned to the pool of available output buffers.

In some embodiments, the log entries written in the log data store 512 may be further processed, such as by using a resource or service of a computing system and/or an associated computing resource service provider, to generate more verbose or human-readable logs than were stored on the output buffers 504. For example, the processing may include the parsing of such log entries against log type declarations in the global declaration list (e.g., the global declaration list 104, 206, 306, described above in connection with at least FIGS. 1 through 3, interleaving of various log entries based on the associated counter values (such as those written by counter 406, described above in connection with at least FIG. 4), and the like. In some embodiments, the log entries present in the output buffers 504 themselves may be processed in a similar fashion, so as to provide, e.g., a freeze-frame or snapshot of an execution state at the observed time.

Figure 6:
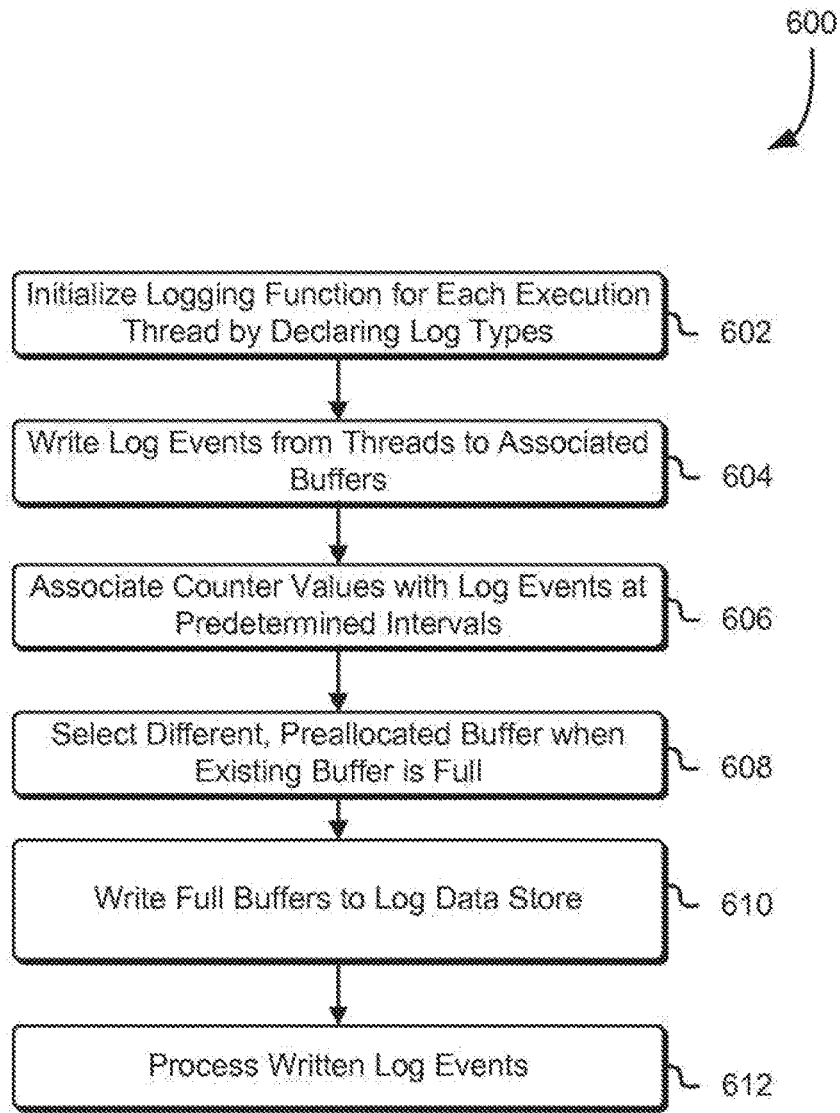
FIG. 6 illustrates an example process for logging events related to execution of code on execution threads, in accordance with some embodiments.

FIG. 6 illustrates an example process for logging events related to execution of code on execution threads, in accordance with some embodiments. At step 602, log type declarations from one or more threads are written to a global declaration list. In some embodiments, the log type declarations are written to the global declaration list by the threads themselves, and in some embodiments, the log type declarations may be generated and written by an entity (e.g., a thread) separate from the threads themselves. The global declaration list may be similar to the global declaration list described above in connection with at least FIGS. 1 through 4. The log type declarations may include various log templates that include data fields, and as previously discussed, may include data types of fixed length, dynamic length, or both.

At step 604, log events from threads are written to output buffers associated with those threads. In some embodiments, as previously discussed, they may be written to conform with the log type declarations in the global declaration list, and in the case that the log event includes data of dynamic length, such writing may occur as a two-stage process. In addition, in certain embodiments, the log events themselves may also generate new or updated log type declarations within the global declaration list. The writing may be executed directly by the threads themselves, or, in some embodiments, by a resource (e.g., a different thread) separate from the threads from which the log events originated.

At step 606, counter values, such as those generated by a counter as described in more detail in connection with at least FIG. 4, are written to the output buffers in connection with the log entries, at predetermined intervals. As previously discussed, the intervals may be determined by the threads themselves, the output buffers, the counter, or some other entity. The intervals may be referenced against a quantity of log entries written, absolute time, system time, or any other value against which a reference can be made.

At step 608, when a given (e.g., active) output buffer is full or can otherwise no longer accept new log entries, the given output buffer is marked as full or unavailable, and a different output buffer (that, in some embodiments, may have been associated with the thread at a previous point in time, such as when the active output buffer was initialized or allocated) within the same set may be selected as the new active output buffer for the associated thread. As previously discussed, the selection (and detection) of such conditions may be performed by a monitoring thread (e.g., a background thread) and/or the execution thread(s), and may occur asynchronously with respect to the threads that generate log events.

At step 610, contents of any output buffers marked as full may be committed, such as by a background thread, to a log data store. The log data store may be similar to the log data store described above in connection with FIG. 5. As previously discussed, the committing/flushing described in step 610 may occur synchronously or asynchronously. For example, the marked output buffers may be flushed to the log data store at a time after the background thread determines that either (or both) the associated thread and/or the output buffer is in an idle condition or has terminated.

At step 612, some or all of the log entries written to the log data store in step 610 may be further processed, such as by an entity or service of a computing resource service provider, to provide human-readable and/or time-coherent logs. As previously discussed, the various log entries may have been written in an out-of-order fashion, and counter values associated with the log entries may be used to interleave the log entries into a time-ordered fashion. Furthermore, log type declarations and other information in the global declaration list may be used to "expand" the data contained in the log entries to provide human-readable logs. Such processing may also be performed against the log entries within the output buffers themselves, to achieve similar effects, and to provide a snapshot of the current and immediately preceding state of execution of the threads.

Figure 7:
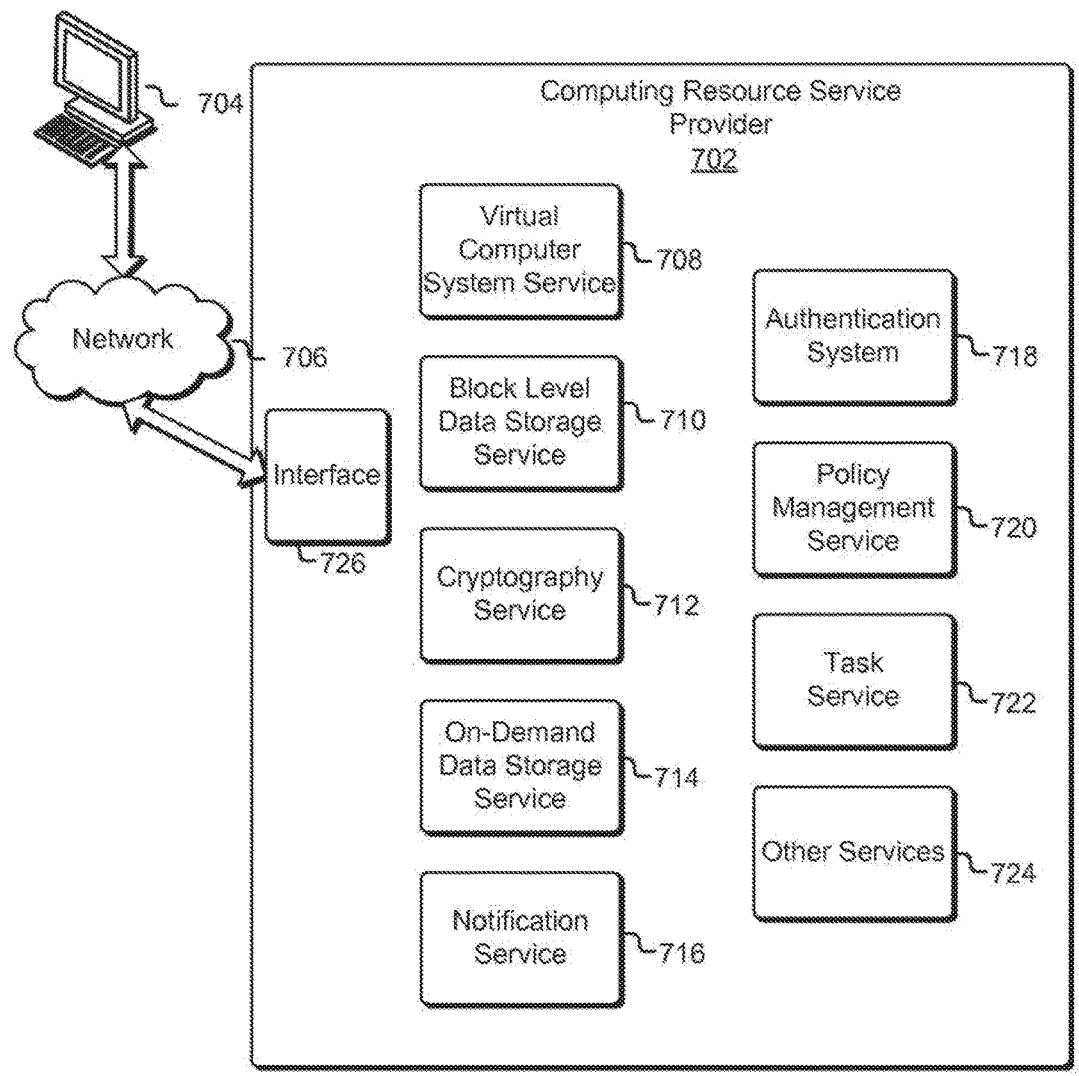
FIG. 7 schematically illustrates an environment of a computing resource service provider capable of implementing various logging techniques described herein, in accordance with some embodiments.

FIG. 7 shows an example of a customer connected to a computing resource service provider in accordance with at least one embodiment. The computing resource service provider 702 may provide a variety of services to the customer 704 and the customer 704 may communicate with the computing resource service provider 702 via an interface 726, which may be a web services interface or any other type of customer interface. While FIG. 7 shows one interface 726 for the services of the computing resource service provider 702, each service may have its own interface and, generally, subsets of the services may have corresponding interfaces in addition to or as an alternative to the interface 726. The customer 704 may be an organization that may utilize one or more of the services provided by the computing resource service provider 702 to maintain and deliver information to its employees, which may be located in various geographical locations. Additionally, the customer 704 may be an individual that utilizes the services of the computing resource service provider 702 to deliver content to a working group located remotely. As shown in FIG. 7, the customer 704 may communicate with the computing resource service provider 702 through a network 706, whereby the network 706 may be a communication network, such as the Internet, an intranet or an Internet service provider (ISP) network. Some communications from the customer 704 to the computing resource service provider 702 may cause the computing resource service provider 702 to operate in accordance with one or more embodiments described or a variation thereof.

The computing resource service provider 702 may provide various computing resource services to its customers. The services provided by the computing resource service provider 702, in this example, include a virtual computer system service 708, a block-level data storage service 710, a cryptography service 712, an on-demand data storage service 714, a notification service 716, an authentication system 718, a policy management service 720, a task service 722 and one or more other services 724. It is noted that not all embodiments described include the services 708-724 described with reference to FIG. 7 and additional services may be provided in addition to or as an alternative to services explicitly described. As described, each of the services 708-724 may include one or more web service interfaces that enable the customer 704 to submit appropriately configured API calls to the various services through web service requests. In addition, each of the services may include one or more service interfaces that enable the services to access each other (e.g., to enable a virtual computer system of the virtual computer system service 708 to store data in or retrieve data from the on-demand data storage service 714 and/or to access one or more block-level data storage devices provided by the block level data storage service 710).

The virtual computer system service 708 may be a collection of computing resources configured to instantiate virtual machine instances on behalf of the customer 704. The customer 704 may interact with the virtual computer system service 708 (via appropriately configured and authenticated API calls) to provision and operate virtual computer systems that are instantiated on physical computing devices hosted and operated by the computing resource service provider 702. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 708 is shown in FIG. 7, any other computer system or computer system service may be utilized in the computing resource service provider 702, such as a computer system or computer system service that does not employ virtualization or instantiation and instead provisions computing resources on dedicated or shared computers/servers and/or other physical devices.

The block-level data storage service 710 may comprise one or more computing resources that collectively operate to store data for a customer 704 using block-level storage devices (and/or virtualizations thereof). The block-level storage devices of the block-level data storage service 710 may, for instance, be operationally attached to virtual computer systems provided by the virtual computer system service 708 to serve as logical units (e.g., virtual drives) for the computer systems. A block-level storage device may enable the persistent storage of data used/generated by a corresponding virtual computer system where the virtual computer system service 708 may only provide ephemeral data storage.

The computing resource service provider 702 also includes a cryptography service 712. The cryptography service 712 may utilize one or more storage services of the computing resource service provider 702 to store keys of the customers in encrypted form, whereby the keys may be usable to decrypt customer 712 keys accessible only to particular devices of the cryptography service 712.

The computing resource service provider 702 further includes an on-demand data storage service 714. The on-demand data storage service 714 may be a collection of computing resources configured to synchronously process requests to store and/or access data. The on-demand data storage service 714 may operate using computing resources (e.g., databases) that enable the on-demand data storage service 714 to locate and retrieve data quickly, to allow data to be provided in responses to requests for the data. For example, the on-demand data storage service 714 may maintain stored data in a manner such that, when a request for a data object is retrieved, the data object can be provided (or streaming of the data object can be initiated) in a response to the request. As noted, data stored in the on-demand data storage service 714 may be organized into data objects. The data objects may have arbitrary sizes except, perhaps, for certain constraints on size. Thus, the on-demand data storage service 714 may store numerous data objects of varying sizes. The on-demand data storage service 714 may operate as a key value store that associates data objects with identifiers of the data objects that may be used by the customer 704 to retrieve or perform other operations in connection with the data objects stored by the on-demand data storage service 714.

In the environment illustrated in FIG. 7, a notification service 716 is included. The notification service 716 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 716 may provide notifications to clients using a "push" mechanism without the need to check periodically or "poll" for new information and updates. The notification service 716 may further be used for various purposes such as monitoring applications executing in the virtual computer system service 708, workflow systems, time-sensitive information updates, mobile applications, and many others.

As illustrated in FIG. 7, the computing resource service provider 702, in various embodiments, includes an authentication system 718 and a policy management service 720. The authentication system 718, in an embodiment, is a computer system (i.e., collection of computing resources) configured to perform operations involved in authentication of users of the customer. For instance, one of the services 708-716 and 720-724 may provide information from a user to the authentication system 718 to receive information in return that indicates whether the user requests are authentic.

The policy management service 720, in an embodiment, is a computer system configured to manage policies on behalf of customers (such as customer 704) of the computing resource service provider 702. The policy management service 720 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 702, in various embodiments, is also equipped with a task service 722. The task service 722 is configured to receive a task package from the customer 704 and enable executing tasks as dictated by the task package. The task service 722 may be configured to use any resource of the computing resource service provider 702, such as one or more instantiated virtual machines or virtual hosts, for executing the task. The task service 724 may configure the one or more instantiated virtual machines or virtual hosts to operate using a selected operating system and/or a selected execution application in accordance with a requirement of the customer 704.

The computing resource service provider 702 additionally maintains one or more other services 724 based at least in part on the needs of its customers 704. For instance, the computing resource service provider 702 may maintain a database service for its customers 704. A database service may be a collection of computing resources that collectively operate to run one or more databases for one or more customers 704. The customer 704 may operate and manage a database from the database service by utilizing appropriately configured API calls. This, in turn, may allow a customer 704 to maintain and potentially scale the operations in the database. Other services include, but are not limited to, object-level archival data storage services, services that manage and/or monitor other services.

As used, unless otherwise stated or clear from context, the term "service" may be understood to be a computer system program, process, client, server, service, application, module, operating system entity, controlling domain, communication node, or collection of these and/or other such computer system entities. A "service" may be a client and/or a server and in some embodiments may be configured to send and/or receive communications, data, requests, and/or other such requests from other services within the computer system.

Figure 8:
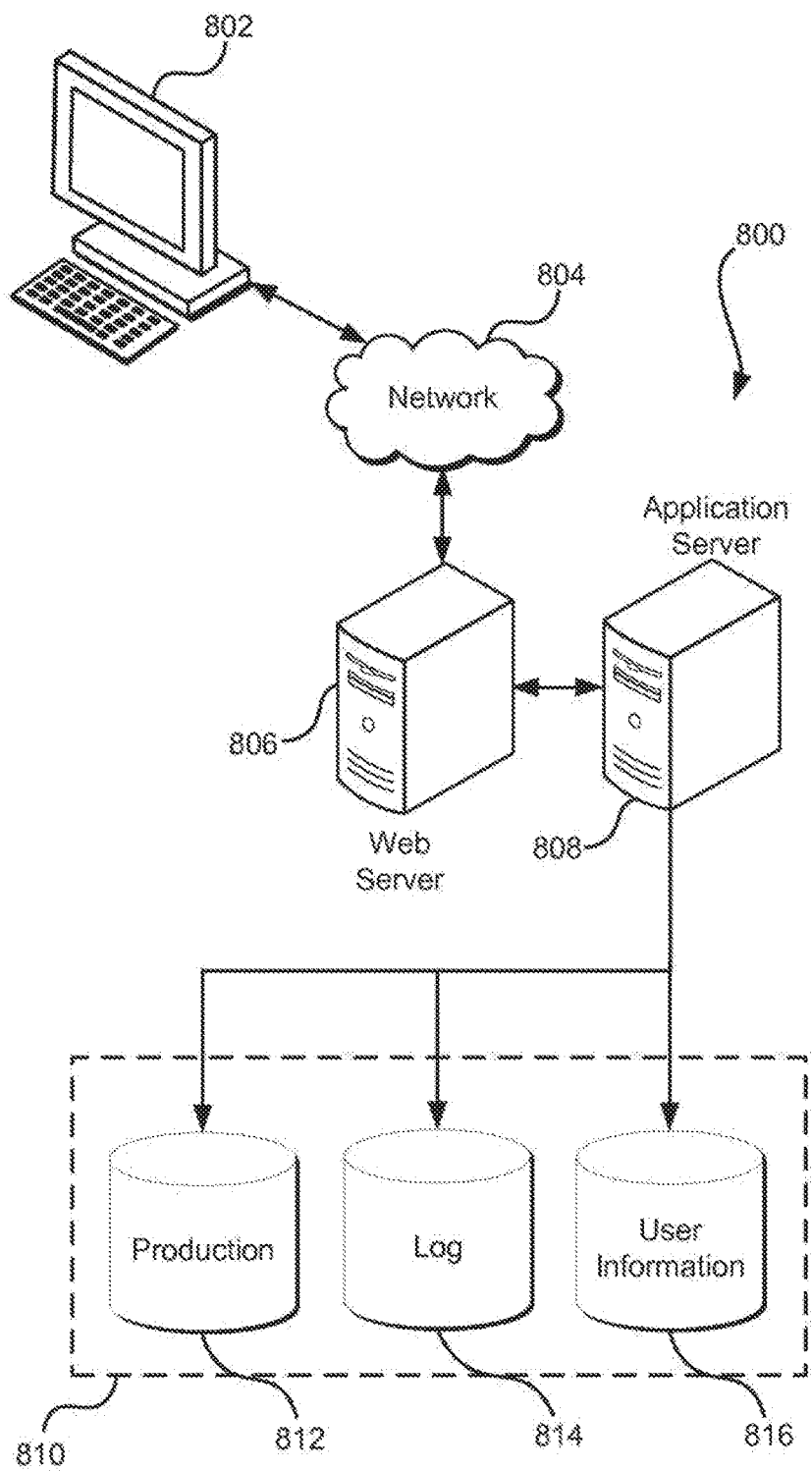
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually, and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
  receiving a request to execute an application;
  instantiating one or more execution threads by at least:
    generating a global declaration list from one or more log type declarations associated with the one or more execution threads; and
    allocating a plurality of output buffers for the one or more execution threads;
  receiving a log event associated with the application;
  determining whether the log event conforms to at least one of the one or more log type declarations;
  selecting an output buffer of the plurality of output buffers as an active output buffer;
  writing a log entry to the active output buffer, the log entry including information from the log event that represents at least one of the log type declarations; and
  providing further information regarding the log event.

2. The computer-implemented method of claim 1, further comprising, at a time after determining that one or more of the threads has unexpectedly terminated, maintaining, by the helper thread, the handles to the plurality of output buffer sets such that contents of the plurality of output buffer sets is not affected by the unexpected termination of the one or more threads.

3. The computer-implemented method of claim 1, wherein the further information includes verbose log data based at least in part on other log entries in the log data store and the global declaration list.

4. The computer-implemented method of claim 1, further comprising:
  writing a counter value to the active output buffer at a specified interval; and
  at a time after determining that the active output buffer is full, at least:
    marking, by a monitoring thread, the active output buffer as full;
    selecting, by the monitoring thread, a second subset of output buffers of a respective output buffer set to which the active output buffer belongs;
    committing, by the monitoring thread, the selected subset of output buffers to a log data store; and
    unmarking the active output buffer such that the active output buffer is no longer marked as full.

5. A system, comprising:
  one or more processors; and
  memory including instructions that, when executed by the one or more processors, cause the system to:
    process a request to start a plurality of threads by at least:
      generating a global declaration list that includes one or more log type declarations;
      allocating output buffers for the plurality of threads; and
      at a time after receiving log events from the plurality of threads, writing log entries derived from the log events to the allocated output buffers, the log entries conforming to at least one of the log type declarations.

6. The system of claim 5, wherein the instructions, when executed by the one or more processors, further cause the system to allocate a different subset of the output buffers to each thread of the plurality of threads.

7. The system of claim 5, wherein the instructions, when executed by the one or more processors, further cause the system to hold the allocated output buffers such that if one or more of the plurality of threads unexpectedly terminates, contents of the allocated output buffers remain intact.

8. The system of claim 5, wherein the instructions, when executed by the one or more processors, further cause the system to generate the global declaration list from information received from the plurality of threads, the information including the one or more log type declarations.

9. The system of claim 5, wherein the log type declarations include one or more log templates of fixed length.

10. The system of claim 5, wherein the instructions, when executed by the one or more processors, further cause the system to, at a time after determining that at least a subset of the allocated output buffers is unable to accept further log entries, at least flush the subset of the allocated output buffers to a log data store.

11. The system of claim 5, wherein the instructions, when executed by the one or more processors, further cause the system to, after determining that the subset of the allocated output buffers is unable to accept further log entries, write the log entries to a second subset of the allocated output buffers.

12. The system of claim 5, wherein the instructions, when executed by the one or more processors, further cause the system to provide at least some of the log entries in verbose form in response to a second request.

13. A non-transitory computer-readable storage medium having stored thereon executable instructions that, when executed by one or more processors of a computer system, cause the computer system to at least:
  receive a request to initialize one or more threads;
  populate a global declaration list with one or more log type declarations associated with the one or more threads;
  map output buffers to the one or more threads; and
  write, to the mapped output buffers, log entries generated from log events received from the plurality of threads, such that the log entries conform to one or more formats defined by the log type declarations.

14. The non-transitory computer-readable storage medium of claim 13, wherein the instructions further comprise instructions that, when executed by the one or more processors, cause the computer system to, if a subset of the mapped output buffers is full, commit contents of the subset of mapped output buffers to a log data store.

15. The non-transitory computer-readable storage medium of claim 13, wherein the instructions further comprise instructions that, when executed by the one or more processors, cause the computer system to map the output buffers in connection with initializing the one or more threads.

16. The non-transitory computer-readable storage medium of claim 13, wherein the instructions further comprise instructions that, when executed by the one or more processors, cause the computer system to write, at an interval, counter values to the mapped output buffers as metadata in connection with the log entries.

17. The non-transitory computer-readable storage medium of claim 16, wherein the interval is a time interval.

18. The non-transitory computer-readable storage medium of claim 16, wherein the interval is a predetermined quantity of log entries.

19. The non-transitory computer-readable storage medium of claim 16, wherein the counter values include a time stamp provided by the computer system.

20. The non-transitory computer-readable storage medium of claim 13, wherein the instructions further comprise instructions that, when executed by the one or more processors, cause the computer system to write the log entries to the mapped output buffers at a time after at least a subset of the one or more threads have terminated.

* * * * *